United States Patent
Wilm et al.

(10) Patent No.: US 6,783,279 B2
(45) Date of Patent: Aug. 31, 2004

(54) ANGULAR CONTACT BALL-BEARING CAGE WITH LUBRICANT POCKETS

(75) Inventors: Bernhard Wilm, Nudlingen (DE); Wolfgang Loeser, Kutzberg (DE)

(73) Assignee: FAG Kugelfischer AG (DE)

( * ) Notice: Subject to any disclaimer, the term of this patent is extended or adjusted under 35 U.S.C. 154(b) by 19 days.

(21) Appl. No.: 10/197,525

(22) Filed: Jul. 15, 2002

(65) Prior Publication Data

US 2003/0021506 A1 Jan. 30, 2003

(30) Foreign Application Priority Data

Jul. 28, 2001 (DE) .......................................... 101 36 955

(51) Int. Cl.[7] .............................................. F16C 33/38
(52) U.S. Cl. ....................................... 384/470; 384/533
(58) Field of Search ................................ 384/470, 523, 384/528, 529, 530, 533, 534

(56) References Cited

U.S. PATENT DOCUMENTS

| | | | | |
|---|---|---|---|---|
| 1,494,012 A | * | 5/1924 | Parsons | 384/530 |
| 3,743,369 A | * | 7/1973 | Langstrom | 384/470 |
| 4,226,484 A | * | 10/1980 | Glassow et al. | 384/470 |
| 5,806,990 A | * | 9/1998 | Ueno et al. | 384/530 |
| 6,074,099 A | * | 6/2000 | Mutou et al. | 384/533 |
| 6,447,169 B2 | * | 9/2002 | Chambert | 384/523 |

FOREIGN PATENT DOCUMENTS

GB 283542 5/1928

* cited by examiner

*Primary Examiner*—Thomas R. Hannon
(74) *Attorney, Agent, or Firm*—Ostrolenk, Faber, Gerb & Soffen, LLP

(57) ABSTRACT

A window-type cage for an angular contact ball bearing. Lubricant pockets are provided in the spherical pocket surfaces which are provided for guiding the balls. These lubricant pockets are all arranged in regions which lie outside the bearing points between the ball and the cage in both the circumferential direction and the axial direction, such that the wall thickness of the cage at the bearing points is not reduced by the position and design of the lubricant pockets.

10 Claims, 2 Drawing Sheets

VIEW X

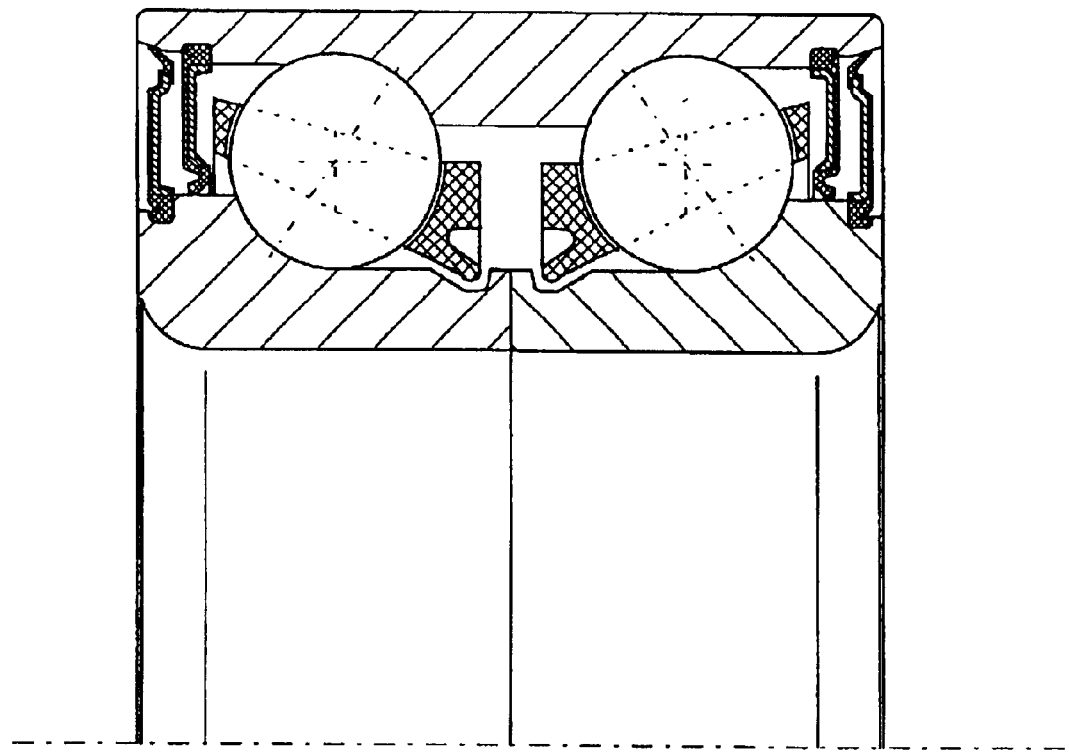
PRIOR ART  FIGURE 1
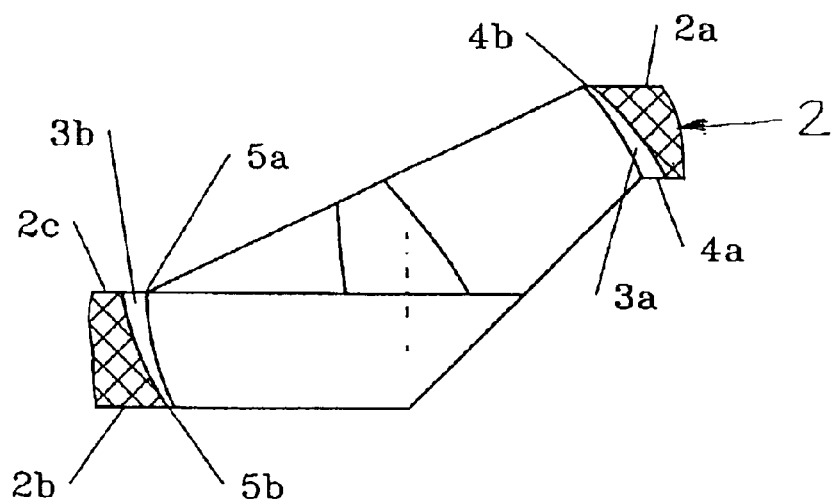
SECTION A - B
FIGURE 4

VIEW X

ANGULAR CONTACT BALL-BEARING CAGE WITH LUBRICANT POCKETS

FIELD OF THE INVENTION

The invention relates to a window-type cage for an angular contact ball bearing, the cage having lubricant pockets.

BACKGROUND OF THE INVENTION

The general function of cages in ball bearings is to guide balls in the rolling-contact bearing. In this arrangement, the balls run against the webs of the cage. The lubricant placed in the ball bearing also has the function of lubricating the contact between the balls and the cage to prevent direct contact between materials and thus avoid wear.

In order to keep the lubricant in the ball bearing or between the cage and the ball, lubricating pockets are formed, as shown in GB 28 35 42. However, these lubricating pockets lie in the region of the interface between the ball and the cage in the circumferential direction or the axial direction. At these locations, the cages are additionally weakened by the lubricating pockets since the cage has the smallest wall thickness here. The problem of cage wall thickness between two adjacent balls can also be solved by arranging fewer balls in the ball bearing. However, both measures have a negative effect on the life of the ball bearing.

SUMMARY OF THE INVENTION

It is the object of the invention to store lubricant between the cage and the ball of a bearing without prejudicing the strength of the cage and without having to reduce the number of balls in the rolling-contact bearing.

This object is achieved by the invention which provides particular shape and placement of lubricant pockets on the cage to avoid weakening at the ball to cage interfaces.

The essential point of the invention is to store lubricant on the cage at locations outside the bearing points between the cage and the ball in the circumferential direction and the axial direction, that is outside the locations on the cage with the smallest wall thickness. At these locations, the wall thickness of the cage is great enough that the cage is barely weakened by the additional lubricating pockets.

Shaping the lubricant pocket as a generally wedge shaped recess in the pocket surface of the window-type cage holds the lubricant in the pocket for a long time. In this arrangement, the lubricating pocket has a larger cross section in the center of the cage between the outer and the inner circumferential surface (or on the pitch circle) and the cross section becomes smaller toward the circumferential surface. The offset arrangement of the lubricant pockets below and above the center of the cage or pitch circle always arranges at least one lubricant pocket in such a way that this lubricant pocket stores the lubricant by virtue of its wedge shape (large cross section leading to small cross section), irrespective of the direction of rotation of the ball.

BRIEF DESCRIPTION OF THE DRAWINGS

FIG. 1 shows a section through part of a prior art double-row angular contact ball bearing, FIG. 4 shows the window-type cage in section plane A-B in FIG. 3.

DESCRIPTION OF A PREFERRED EMBODIMENT

FIG. 1 shows a prior-art double-row angular contact ball bearing in section parallel to the axis of rotation and without lubricating pockets.

Figure 2:
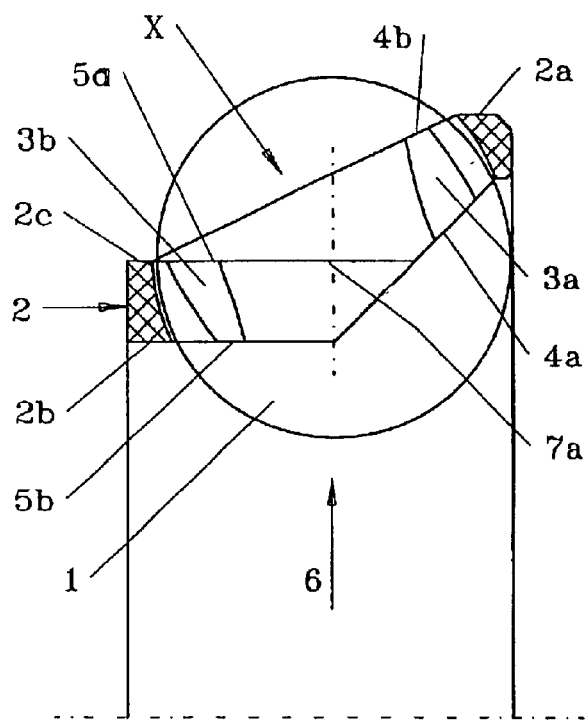
FIG. 2 shows the window-type cage of the angular contact ball bearing in section parallel to the axis of rotation.

FIG. 2 shows the window-type cage 2 of an angular contact ball bearing in a section parallel to the axis of rotation. The circumference of the ball 1 that is guided in the cage pocket of the cage is indicated. The lubricant pockets 3a, 3b lying behind the ball are visible. The window-type cage 2 has an outer circumferential surface 2a and an inner circumferential surface 2b. The cage has a center 2c that is at a surface that lies approximately on the pitch circle of the angular contact ball bearing and is at least approximately at the radial position of the center of the ball. The orientation of the cage is inclined as illustrated with reference to the axis.

A first lubricant pocket 3a lies above the center 2c of the cage. The pocket is also axially outward of the center of the ball. It has a larger cross section 4a in the direction toward the center 2c of the cage and a smaller cross section 4b at the outer surface 2a. Another second lubricant pocket 3b lies below the center 2c of the cage. That pocket is also axially inward of the center of the ball. It has a larger cross section 5a in the direction toward the center 2c of the cage and a smaller cross section 5b at the inner circumferential surface 2b. This illustrated opposing arrangement of pockets makes clear that one of the lubricant pockets provides a wedge action and thus holds the lubricant in the one lubricant pocket, irrespective of the direction of rotation 6 of the angular contact ball bearing or ball 1.

Figure 3:
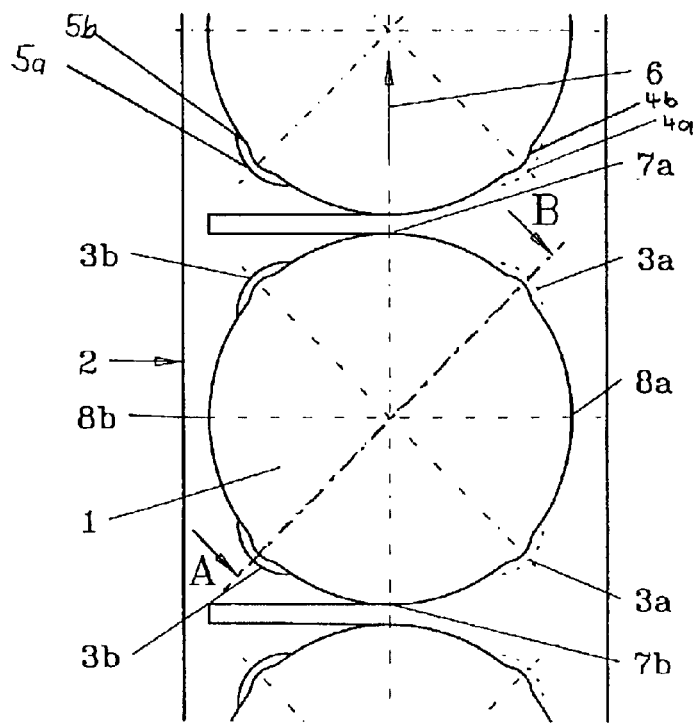
FIG. 3 shows the window-type cage in plan view.

FIG. 3 shows the window-type cage 2 in plan view, with the ball 1 shown. In the lubricant pockets 3b situated below the radial direction center 2c of the cage, the large cross section 5a and the small cross section 5b are indicated by a solid line. In the lubricant pockets 3a situated above the radial direction center 2c of the cage, the small cross section 4b is represented by a solid line and the large cross section 4a is represented by dashes (edge not visible). This illustrates the positions of the lubricating pockets 3a, 3b outside the bearing points between the ball and the cage in the circumferential direction, points 7a, 7b, and in the axial direction, points 8a, 8b.

FIG. 4 shows a section through the plane A-B in FIG. 3.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A window-type cage for an angular contact ball bearing comprising, an annular cage having ball pockets around a circumference, the ball pockets having spherical pocket surfaces for guiding balls in the ball pockets as the balls rotate; wherein there are bearing points in the pocket surfaces between the ball and the pocket surfaces; and lubricant pockets in the pocket surfaces, in regions of the pocket surfaces which lie outside the bearing paints between the balls and the cage in both the circumferential and in axial directions of the cage, enabling the wall thickness of the cage at the bearing points to not be reduced as a result of positioning of the lubricant pockets outside the bearing points, the lubricant pockets being sized and configured to enable storage of lubricant therein for release over time.

2. The window type cage of claim 1, wherein there are four of the lubricant pockets at each ball in the pocket surfaces, each lubricant pocket situated at an angle of approximately 45° to the circumferential direction of circulation of the ball.

3. A window-type cage for an angular contact ball bearing comprising, an angular cage having ball pockets around a circumference, the ball pockets having spherical pocket surfaces for guiding balls in the ball pockets as the balls rotate; wherein there are bearing points in the pocket surfaces between the ball and the pocket surfaces; and lubricant pockets in the pocket surface, in regions of the pocket surfaces which lie outside the hearing points between the balls and the cage in both the circumferential and in axial directions of the cage, enabling the wall thickness of the cage at the bearing points to not be reduced as a result of positioning of the lubricant pockets outside the bearing points, wherein:

the cage is oriented to include a first part above the radial center of a ball in the ball pocket of the cage and a second part below the radial center of the ball in the ball pocket of the cage;

a first one of the lubricant pockets in the first cage part above the radial center of the cage has a first cross section, a second one of the lubricant pockets in the second cage part below the radial center of the cage has a second cross-section; and both of the first and second cross-sections increase in the radial direction of the pockets toward the center of the cage from the outer circumferential surface and from the inner circumferential surface respectively of the cage for enabling storing lubricant in at least one of the lubricant pockets irrespective of the direction of rotation of the balls.

4. The window type cage of claim 3, wherein each lubricant pocket is generally wedge shaped, being wider at the side directed radially toward the center of the cage such that the wedge shapes widen in respective opposite directions.

5. The window type cage of claim 3, wherein the cage is oriented with respect to a row of balls in the pockets with the first cage part radially outward of the second cage part.

6. An angular contact ball bearing assembly comprising:

an angular cage supporting a plurality of bearing balls, the angular cage having a plurality of ball pockets around a circumference thereof, the ball pockets having spherical pocket surfaces for guiding balls in the ball pockets as the balls rotate;

wherein there are bearing points in the pocket surfaces between the ball and the pocket surfaces; and a plurality of lubricant pockets in the each of the ball pocket surfaces, the lubricant pockets being located in regions of the ball pocket surfaces which lie outside the bearing points between the balls and the cage in both the circumferential and in axial directions of the cage, whereby the wall thickness of the cage at the bearing points to not be reduced as a result of positioning of the lubricant pockets outside the bearing points, the lubricant pockets being sized and configured to enable storage of lubricant therein for release over time.

7. The bearing assembly of claim 6, wherein there are four of the lubricant pockets at each ball in the pocket surfaces, each lubricant pocket situated at an angle of approximately 45° to the circumferential direction of circulation of the ball.

8. An angular contact ball bearing assembly comprising:

an angular cage supporting a plurality of bearing balls, the angular cage having a plurality of ball pockets around a circumference thereof, the ball pockets having spherical pocket surfaces for guiding balls in the ball pockets as the balls pocket surfaces; and a plurality of lubricant pockets in the each of the ball pocket surfaces, the lubricant pockets being located in regions of the ball pocket surfaces which be outside the hearing points between the balls and the cage in both the circumferential and in axial directions of the cage, whereby the wall thickness of the cage at the bearing points to not be reduced as a result of positioning of the lubricant pockets outside the bearing points wherein:

the cage is oriented to include a first part above the radial center of a ball in the ball pocket of the cage and a second part below the radial center of the ball in the ball pocket of the cage;

a first one of the lubricant pockets in the first cage part above the radial center of the cage and having has a first cross section, a second one of the lubricant pockets in the second cage part below the radial center of the cage has a second cross-section;

both of the first and second cross-sections increase in the radial direction of the pockets toward the center of the cage from the outer circumferential surface and from the inner circumferential surface respectively of the cage for enabling storing lubricant in at least one of the lubricant pockets irrespective of the direction of rotation of the balls.

9. The bearing assembly of claim 8, wherein each lubricant pocket is generally wedge shaped, being wider at the side directed radially toward the center of the cage such that the wedge shapes widen in respective opposite directions.

10. The bearing assembly of claim 8, wherein the cage is oriented with respect to a row of balls in the pockets with the first cage part radially outward of the second cage part.

* * * * *